Figure 1:
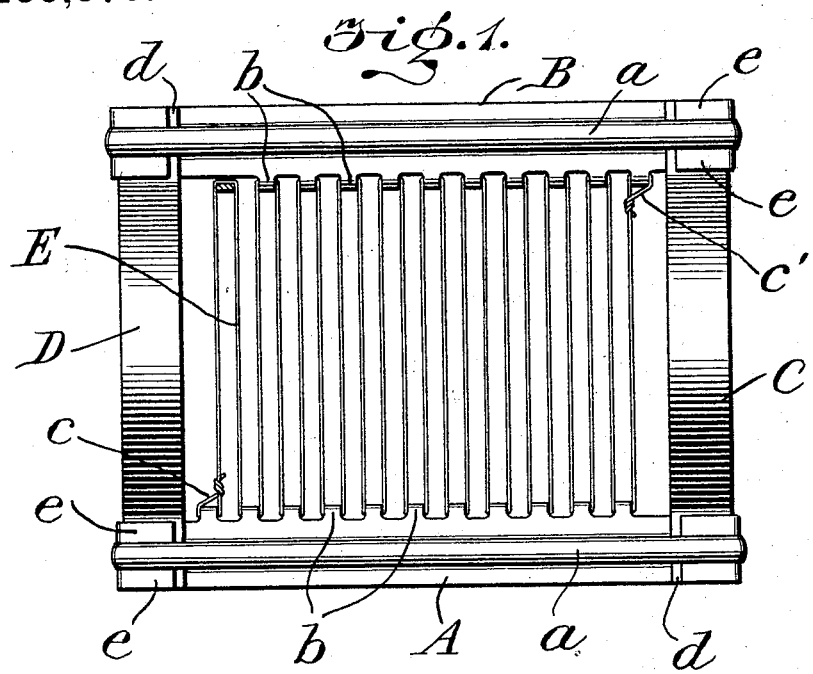

O. GREENWALD.
VEGETABLE SLICER.
APPLICATION FILED AUG. 5, 1916.

1,199,370.

Patented Sept. 26, 1916.

INVENTOR
Otto Greenwald
BY
ATTORNEYS

UNITED STATES PATENT OFFICE.

OTTO GREENWALD, OF NEW YORK, N. Y.

VEGETABLE-SLICER.

1,199,370.  Specification of Letters Patent.  Patented Sept. 26, 1916.

Application filed August 5, 1916. Serial No. 113,227.

*To all whom it may concern:*

Be it known that I, OTTO GREENWALD, a citizen of the United States, residing at the city of New York, county of New York, and State of New York, have invented a certain new and useful Vegetable-Slicer, of which the following is a specification.

This invention is a device for slicing various substances, such as fruits, vegetables, etc.; and the object in view is a culinary or kitchen appliance to be used by hand for cutting the material easily and quickly into slices or pieces of a desired size and shape, the new article being easily cleansed and being, moreover, economical of manufacture.

In the device of this invention an attenuated member such as a wire or ribbon is employed as the cutting means, said attenuated member such as the wire or ribbon being continuous and being doubled to produce a number of parallel lengths spaced preferably equidistantly.

A salient feature of the invention consists of means whereby tension is maintained equally on the manifolded continuous wire or ribbon without resorting to the use of separate tensioning means.

In a preferred embodiment of the invention, the device comprises a plurality of supporting members, an attenuated member in the form of a wire or ribbon the parallel portions of which are connected with said members so as to span the space between the same, and a spring or springs attached to said members for forcing the same away from each other so as to exert the tension upon said wire or ribbon required to maintain the several lengths thereof in a taut condition.

Two springs are used, one at each end of the device, and said springs are fastened rigidly to the supporting members, whereby the springs act in a two fold capacity, i. e. as tension means for the wire or ribbon and as handles in the manipulation of the implements.

The supporting members are preferably each formed of metal, ribbed or channeled to secure the required stiffness, and, further, said members are provided with clips or hooks around which the wire or ribbon is looped, the respective ends of said wire being anchored fixedly, the whole arrangement being such that all parts are exposed for ready access in cleaning the device so as to keep it in a sanitary condition.

The device is intended to be used in connection with a tray the cross sectional form of which is such that the attenuated cutting member or wire cuts clear through the material, without leaving any of the material in an uncut condition. To this end, the tray is channeled and is bulged upwardly intermediate the channels in such manner that the wire cuts through the material resting upon the bulged part whereas the supporting members of the cutter are adapted to be forced downwardly substantially into the channels, the springs and the wire yielding to the pressure so that the wire conforms or flexes to the bulged middle part of the tray.

Other features and advantages of the invention will appear from the following detailed description taken in connection with the drawings, wherein—

Figures 2, 3:
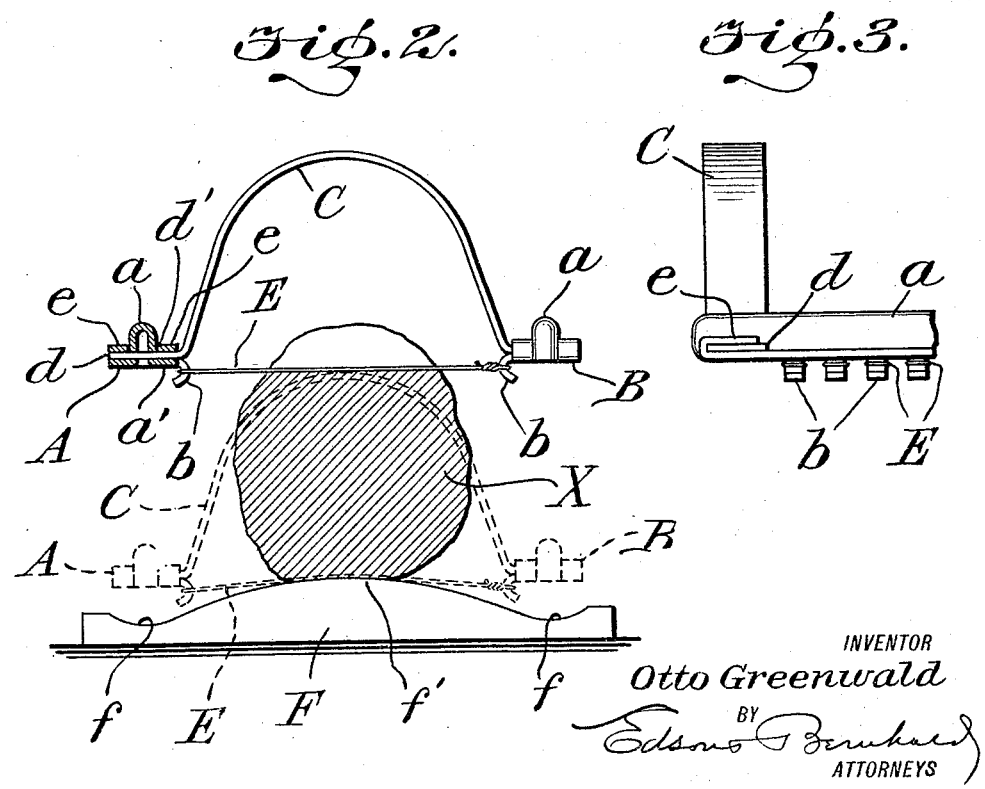

Figure 1 is a plan view of the slicing device of this invention. Fig. 2 is a vertical section through the slicer and the tray illustrating the manner of cutting the material. Fig. 3 is a detail section of one particular means for attaching an end portion of a spring to one of the supporting members.

The slicing devices of this invention comprises a plurality of supporting members A B, a plurality of bowed springs C D and a substantially continuous attenuated cutting member in the form of a wire or ribbon E. The supporting members A B are retained in parallel relation by the bowed springs, said springs being positioned substantially at the end portions of the supporting members, and the end portions of each spring being fastened to end portions of the supporting members.

The supporting members may be composed of any material suitable for the purpose, but for economy of manufacture and durability in service, it is preferred to make each supporting member A or B from a single piece of metal. Said supporting member is shown in the drawings as consisting of a metal piece, the middle part of which is ribbed at $a$, producing side flanges at the respective sides of the rib. The flanges on the innermost edges of the two members A, which flanges are indicated at $a'$, are provided with clips or hooks $b$ (see Fig. 2). The hooks $b$ are positioned at intervals along the inner marginal portion of each supporting member, and in the assemblage of the parts composing the slicing device the hooks *b* of one member are positioned in staggered or alternate relation to the hooks of the other member, considered transversely of the device. The relative arrangement of the hooks *b* on the respective members A B enables me to use a substantially continuous wire or ribbon and to connect said wire or ribbon alternately to the members A B by looping the wire around the hooks *b*, whereby the wire is manifolded to produce a succession of parallel lengths equidistantly spaced along the side members A B.

The wire or ribbon is composed of a strong thin filament of drawn metal, preferably steel, but it is apparent that any material suitable for the purpose may be employed. One end of the wire or ribbon is attached as at *c* to one member A, whereas the other end of the wire or ribbon is anchored at *c'* to the member B, said wire or ribbon spanning the space between the members A B.

The springs C D each consist of a piece of arched spring metal, preferably steel, the end portions of each spring being bent to form short arms *d*. Said arms *d* of the springs pass through holes *d'* formed in the bent stay portions *a* of the supporting members, (see Fig. 2), and thereafter the side flanges of the supporting members are bent or doubled over said arms *d* of the springs, said bent or doubled portions of the side flanges being indicated at *e* in Figs. 1 and 3, whereby the arms C D are locked to the end portions of the supporting members A B. It is not desired to restrict the invention to the particular means for rigidly attaching the end portions of the springs to the end portions of the supporting members for the reason that the attachment of the springs to the supporting members may be modified or changed by a skilled constructor.

It is apparent that the springs yieldably connect the supporting members, and that the connecting wire or ribbon will yield or give somewhat according to the resistance of the material to the passage of the wire or ribbon through said material. The springs C D serve two important functions in my device; first, they connect the supporting members A B so as to permit a certain amount of yield or give, and, second, the springs serve as handles in grasping the device so as to press it through the material or in the manipulation of the implement.

It is important in a device of this character that the wire or ribbon shall cut entirely through the material, and I have found it desirable to employ a tray F, substantially of the form shown in Fig. 2. The tray may, and preferably does, consist of a piece of wood or other material suitable for the purpose, the top surface of which is provided with channels *f*, which top surface is bulged or extended upwardly as at *f'* intermediate said channels *f*.

In using the device, the material to be sliced, indicated at X of Fig. 2, is placed upon the bulged portion *f'* of the tray, and thereafter the slicing device is placed over the material X, with the wire E in contact with the top of said material. Pressure is now applied to the slicing device so as to force it toward the tray, whereupon the wire E cuts easily and quickly through the material so as to slice it. The downward movement of the slicing device brings the wire E into contact with the arched portion *f'* of the tray, whereupon the continued downward pressure upon the handles C D causes the members A B to be drawn toward each other for a short distance owing to the resistance of the arched portions *f'* to the wire or ribbon E, as a result of which application and pressure to the slicing device the members A B are forced into the channels *f* of the tray, whereby the wire or ribbon conforms to the curvature of the arched portions, and said wire or ribbon is caused to cut entirely through the material, thus severing said material into clean-cut thin slices. It is apparent, furthermore, that the sliced material may be arranged on the tray for the wire or ribbon to cut through the sliced material at a right angle, thus further reducing the dimensions of the pieces of material.

From the foregoing description, it will be seen that the device is quite simple in construction, comprising a relatively few number of parts capable of easy manufacture and assemblage, so as to be economically produced. The entire slicing device is compact, strong, durable and efficient, and, moreover, all the parts are accessible for easy cleaning so as to maintain said device in a sanitary condition. The slicing device can be inverted, so that a brush or other cleaning implement can be run along the hooked portions of the members A B for removing matter which may have a tendency to adhere thereto.

Having thus fully described the invention, what I claim as new, and desire to secure by Letters Patent is:—

1. A slicing device embodying a plurality of supporting members, means for yieldably connecting said members, and an attenuated cutting member attached to said supporting members and retained in a taut condition by the relative movement between said members.

2. A slicing device embodying a plurality of supporting members, means for yieldably connecting said members, and an attenuated cutting member attached to said supporting members and retained in a taut condition by the relative movement between said members, said yieldable connecting means being positioned for service as a handle in the manipulation of the device.

3. A slicing device embodying a plurality of supporting members, springs attached to said members for yieldably connecting the same, and an attenuated cutting member attached to the supporting members.

4. A slicing device embodying a plurality of supporting members, bowed springs fastened to said members and positioned to serve as a handle in the manipulation of the device, and an attenuated cutting member attached to said supporting members and spanning the space intervening the same.

5. A slicing device embodying a plurality of supporting members provided with clips, a substantially continuous attenuated cutting member having looped engagement with said clips, and yieldable means connecting said supporting members and operating to retain the attenuated cutting member in a taut condition.

6. The combination of a tray the top surface of which is bulged, and a yieldable slicer characterized by a substantially continuous attenuated cutting member adapted, under the application of pressure, to conform to the bulged surface of said tray.

7. The combination of a tray the side portions of which are channeled and the top surface of which extends upwardly between the channeled portions, and a yieldable slicer embodying side supporting members and an attenuated cutting member attached to said supporting members, said attenuated cutting member being yieldable to conform to the upwardly extended surface of the tray when pressure is applied to the slicer so as to depress the side members into the channels of said tray.

In testimony whereof, I have hereunto signed my name.

OTTO GREENWALD.

Copies of this patent may be obtained for five cents each, by addressing the "Commissioner of Patents, Washington, D. C."